(12) United States Patent
Logan et al.

(10) Patent No.: US 7,631,088 B2
(45) Date of Patent: Dec. 8, 2009

(54) SYSTEM AND METHOD FOR MINIMIZING PERCEIVED DEAD AIR TIME IN INTERNET STREAMING MEDIA DELIVERY

(76) Inventors: Jonathan Logan, 241 Polaris Ave., Mountain View, CA (US) 94043; David Frerichs, 560 Fairmont, Mountain View, CA (US) 94041; James Eric Mason, 130 Arch St., #12, Redwood City, CA (US) 94062

( * ) Notice: Subject to any disclaimer, the term of this patent is extended or adjusted under 35 U.S.C. 154(b) by 1598 days.

(21) Appl. No.: 09/798,797

(22) Filed: Feb. 27, 2001

(65) Prior Publication Data

US 2002/0120752 A1 Aug. 29, 2002

(51) Int. Cl.
G06F 15/16 (2006.01)

(52) U.S. Cl. .................. 709/228; 709/203; 709/231; 709/217; 709/219; 709/227; 709/232; 370/356; 370/375; 370/379; 715/718

(58) Field of Classification Search .......... 709/231, 709/203, 228, 217, 219, 227, 232; 370/356, 370/375, 379; 715/718
See application file for complete search history.

(56) References Cited

U.S. PATENT DOCUMENTS

| | | | |
|---|---|---|---|
| 5,142,528 A | 8/1992 | Kobayashi | |
| 5,490,275 A | 2/1996 | Sandvos | |
| 5,557,541 A | 9/1996 | Schulhof | 364/400.01 |
| 5,572,442 A | 11/1996 | Schulhof | 709/219 |
| 5,629,867 A | 5/1997 | Goldman | 381/77 |
| 5,721,956 A | 2/1998 | Martin | |
| 5,726,909 A | 3/1998 | Krikorian | 700/94 |
| 5,734,119 A | 3/1998 | France et al. | |
| 5,790,423 A | 8/1998 | Lau | 364/400.01 |
| 5,809,246 A | 9/1998 | Goldman | 395/200.47 |
| 5,815,707 A | 9/1998 | Krause | |
| 5,822,537 A | 10/1998 | Katseff | |
| 5,828,839 A | 10/1998 | Moncrieff | 395/200.34 |
| 5,841,979 A | 11/1998 | Schulhof | 395/200.67 |
| 5,844,158 A | 12/1998 | Butler et al. | |
| 5,892,536 A | 4/1999 | Logan | 348/13 |
| 5,922,045 A | 7/1999 | Hanson | 709/206 |
| 5,926,624 A | 7/1999 | Katz | 395/200.47 |
| 5,956,681 A | 9/1999 | Yamakita | 704/260 |
| 6,005,563 A * | 12/1999 | White et al. | 715/718 |
| 6,012,086 A | 1/2000 | Lowell | 709/218 |
| 6,014,569 A | 1/2000 | Bottum | 455/466 |
| 6,047,323 A | 4/2000 | Krause | |
| 6,222,979 B1 | 4/2001 | Willis et al. | 386/46 |
| 6,223,292 B1 | 4/2001 | Dean et al. | 713/202 |
| 6,226,616 B1 | 5/2001 | You et al. | 704/500 |
| 6,248,946 B1 | 6/2001 | Dwek | |

(Continued)

OTHER PUBLICATIONS

U.S Appl. No. 08/984,722, Sass.

(Continued)

Primary Examiner—Ario Etienne
Assistant Examiner—Barbara N Burgess (57) ABSTRACT

A system for supplying streaming media or other media sources to clients, where said system minimizes the lag time perceived by the user during negotiation between media sources by outputting the media content remaining in the buffer while the system is negotiating connection and buffering information from a second media source.

27 Claims, 5 Drawing Sheets

U.S. PATENT DOCUMENTS

| | | | |
|---|---|---|---|
| 6,249,810 B1 | 6/2001 | Kiraly | 709/207 |
| 6,289,207 B1 | 9/2001 | Hudecek | 455/150.1 |
| 6,385,212 B1 * | 5/2002 | Baba et al. | 370/506 |
| 6,405,255 B1 | 6/2002 | Stoltz | |
| 6,408,315 B1 | 6/2002 | McManus et al. | 707/500 |
| 6,430,236 B1 | 8/2002 | Funakoshi | 375/340 |
| 6,449,260 B1 | 9/2002 | Sassin et al. | |
| 6,456,601 B1 | 9/2002 | Kozdon et al. | |
| 6,493,446 B1 | 12/2002 | Cherry | |
| 6,496,205 B1 | 12/2002 | White et al. | |
| 6,526,041 B1 | 2/2003 | Shaffer et al. | |
| 6,539,417 B2 | 3/2003 | Stern | |
| 6,546,427 B1 * | 4/2003 | Ehrlich et al. | 709/231 |
| 6,625,656 B2 * | 9/2003 | Goldhor et al. | 709/231 |
| 6,654,367 B1 * | 11/2003 | Kaufman | 370/356 |
| 6,662,231 B1 | 12/2003 | Drosset et al. | |
| 6,678,215 B1 * | 1/2004 | Treyz et al. | 368/10 |
| 6,721,489 B1 | 4/2004 | Benyamin et al. | |
| 6,728,763 B1 | 4/2004 | Chen | |
| 6,766,376 B2 * | 7/2004 | Price | 709/231 |
| 6,769,027 B1 * | 7/2004 | Gebhardt et al. | 709/228 |
| 6,769,028 B1 | 7/2004 | Sass et al. | |
| 6,823,225 B1 | 11/2004 | Sass | |
| 6,848,002 B1 * | 1/2005 | Detlef | 709/231 |
| 2002/0103919 A1 * | 8/2002 | Hannaway | 709/231 |
| 2002/0133247 A1 * | 9/2002 | Smith et al. | 700/94 |
| 2005/0165942 A1 * | 7/2005 | McDowall et al. | 709/231 |
| 2006/0007923 A1 | 1/2006 | Boys | |

OTHER PUBLICATIONS

U.S. Appl. No. 11/041,148, entitled "System and method for limiting dead air time in internet streaming media delivery", by McDowall, et al., filed on Jan. 21, 2005.

* cited by examiner

SYSTEM AND METHOD FOR MINIMIZING PERCEIVED DEAD AIR TIME IN INTERNET STREAMING MEDIA DELIVERY

FIELD OF THE INVENTIONS

The present invention relates generally to the field of global network of computers, and more particularly to transmission and reception of streaming media content from the internet.

BACKGROUND OF THE INVENTIONS

Recently, radiobroadcasters have begun providing their audio content over the internet. Listeners can receive and play the audio content with a number of currently available devices. For example, a home listener can receive and play audio content or "netcasts" with a personal computer ("PC") based device. PC based devices generally include a PC, an internet account, a browser software such as Internet Explorer® or Netscape Navigator®, an audio processing software "plug-in" capable of processing audio information, and a radio simile graphical interface. Listeners can also receive and play netcasts with devices known as internet appliances. In our co-pending application, Internet Radio Receiver and Interface, U.S. application Ser. No. 09/334,846, we describe a radio receiver like internet appliance having all the necessary components to receive and play audio content over the internet.

Audio files provided by internet radiobroadcasters are typically large and if downloaded as a whole could take several minutes of wait time for each one minute of audio play time. A process called streaming audio allows the user to listen to the audio continuously after a buffer is filled with audio data (as opposed to downloading the audio file and playing the file after the download is complete). A percentage of the streaming audio data file is temporarily stored in the buffer until it is transferred for outputting. There are a number of streaming audio formats available. The common ones today include Real Networks G2 and G7, Microsoft Windows Media, Shoutcast MP3 and Icecast MP3.

When a listener using the PC based device changes from one internet radio station to another, the PC based device must (a) stop playing from the current station and flush the buffer, (b) establish a data connection with the new station, (c) receive and fill the buffer with streaming data from the new station, (d) start decoding the streaming data, and (e) start playing the streaming data from the head of the buffered data while adding new streaming audio data to the tail of the buffered data. Step (c) is commonly called buffering or pre-buffering and may take on the order of several seconds depending on the user's connection quality to the network, the network traffic, and the characteristics of the streaming audio to which the user is trying to connect. The buffering process results in a delay in audio output, resulting in a period of silence referred to as dead air time. Currently, this dead air time is filled with silence. Where the audio to presented through a PC with a display, it is visually represented on the PC screen with a small progress bar. Because the user hears no audio during the buffering process, the progress bar is a crucial element. Savvy PC based device users are accustomed to such delays in getting access to audio content.

On the other hand, users listening to audio on a radio receiver are not accustomed to delays in getting access to the audio. When a user switches radio stations on the radio receiver, the user expects the radio receiver to respond quickly with the audio from the new radio station. The radio receiver user experiences little, if any, dead air time. Our internet radio appliances mimic the functionality of traditional AM/FM radios, allowing the user to listen to internet "radio stations" through an appliance that does not require a fully functional personal computer, and instead functions in a manner similar to the traditional radio receiver. Because our internet appliances mimic typical radio receivers, users will expect the internet appliance to respond quickly with audio. The user will expect little, if any, dead air time.

However, when the user changes internet radio stations on an internet appliance, the internet appliance also undergoes the buffering or pre-buffering process described above. Communicating the progress of the buffering process to the user is difficult on the internet appliance since the user is not sitting in front of a computer screen, and the internet appliance preferably has a minimal graphical interface. The internet appliance generally has simple knobs and buttons, and the user may or, ideally, may not be presented with a progress bar. Silence or dead air time experienced on the internet appliance is annoying and potentially confusing to the user. The user will not know whether the internet appliance is still connected to the internet or if the internet appliance has encountered some obstacle to connection with a desired netcaster. The user's listening experience is diminished by this dead air time. In the embodiment of our internet radio system, the dead air time is unacceptable.

SUMMARY

To address and minimize dead air time incident to negotiation, buffering and pre-buffering when connecting an internet appliance from a first internet media server to a second internet media server, the system and method described below fills in the dead air time with audio from the first internet media server remaining in the buffer while the system is negotiating, buffering and pre-buffering audio from the second internet media server. While the user switches from the first to the second media server, the user continues to hear audio already buffered from the first media server. Once the system is ready to play the buffered audio from the second media server, the system stops playing the remaining buffered audio from the first media server and switches to play the buffered audio from the second internet media server. The system either eliminates or minimizes the dead air time perceived by the user.

DETAILED DESCRIPTION OF THE INVENTIONS

Figure 1:
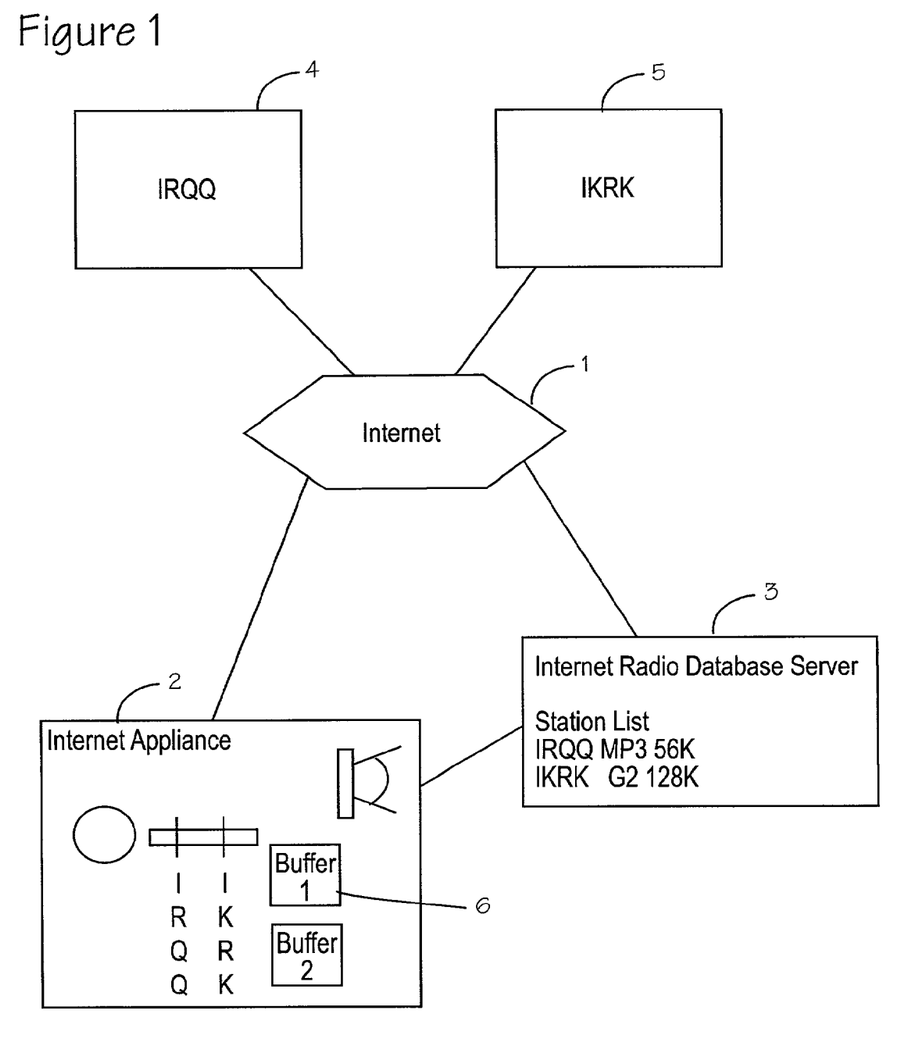
FIG. 1 is a block diagram of the system.

FIG. 1 is a block diagram of the system. The system can include a global computer network (the internet) 1, an internet appliance 2, an internet radio database server 3, and individual content servers, here shown as radio station server IRQQ 4 and radio station server IKRK 5.

The global computer network 1 is preferably the Internet. However, a wide area network, intranet, LAN, or other types of networks may make use of the system. The global computer network allows for communication between computers such as the internet appliance 2, the database server 3, and the radio station server IRQQ 4 and IKRK 5.

The internet appliance 2 includes the user interface whereby the user can select the desired internet radio station by simply tuning it in, just as you would a traditional radio. The internet appliance is fully described in our co-pending application Internet Radio Receiver and Interface, U.S. application Ser. No. 09/334,846, incorporated herein in its entirety. U.S. application Ser. No. 09/334,846 describes devices and method for receiving radio broadcasts (webcasts) over the internet 1 in a device that resembles a typical radio receiver. The hardware is housed in a radio box separate from a personal computer, and the interface is a panel of physical radio knobs, buttons, FM and AM channel indicators, etc., on the radio housing. Inside the radio box, necessary computer components and software permit connection to the internet and communication with various sources of audio information. In one embodiment, the device is a completely stand-alone device that a consumer can plug into a telephone line, ISDN line, DSL line, local area network, or cable line and select radio stations with the same type of controls as a typical radio. In another embodiment, the device is a box that communicates with the internet through the user's personal computer, which must then have an internet connection and internet software installed and operating and communicate with audio components, to play the audio content. In third and fourth embodiments, the internet appliance is either a personal computer or a web TV with the necessary browser software, audio processing software, and radio simile graphical interface.

The system can include the internet radio database server 3. The internet radio database server stores information and disseminates it to the internet appliance 2 over the internet 1. The database server processes the user's request and is the primary interface between the internet appliance and media content sources. The internet radio database server maintains, in this example, internet radio station information, including a list of stations (audio content providers), their streaming media format, bit rate output, and associated URL. The internet radio database server talks to the internet appliance so that the server knows at what connection speed the user is connected to the internet (56K, ISDN, DSL for example) and what streaming media format the user's audio player requires (streaming MP3 for example). (Alternatively, the system may not include the database server. Instead, the internet appliance maintains the internet radio station information. The internet appliance interfaces directly with the media content sources through the internet.)

A plurality of content servers are also connected to the internet, each content server corresponding to a radio station with a call letter, here radio station server IRQQ (item 4) and IKRK (item 5). Each of these radio station servers can be coupled to the internet 1. The radio station servers are preferably coupled to a radio station or webcaster, which has a large depository of music and/or audio information, which can be communicated to the Internet and finally to the internet appliance 2. Here, the audio information is converted into a digital stream format for transmission through the internet. The audio data is provided through streaming media software that provides the audio data to users requesting a connection to the audio data.

Since audio data files are large, a process called streaming audio allows the user to listen to the audio while it downloads to their internet appliance 2, but leaves behind no physical file on the internet appliance. When the user selects an internet radio station, the internet appliance sends a request to the internet radio database server 3. The internet radio database server responds with the URL of the internet radio station server the user wants to play and also has instructions that tell what internet appliance audio processing software is required to play the requested audio content. The internet appliance, the database server, and the radio station server negotiate to arrange the transmission of streaming audio content to the user. The requested audio content has, in most instances, been compressed and encoded.

The requested audio content is transmitted in "packets" of compressed audio data, and these packets are sent to a first buffer 6 on the internet appliance 2. A buffer is an area of memory for temporarily storing the packets. The size of the buffer generally ranges from 5 KB up to several hundred Kbytes depending on the network characteristics, stream type, and stream bit rate. The buffer can also be filled with decompressed audio data as well. Once the first buffer is filled to a predetermined level of audio data (also called the "low-water mark"), the internet appliance starts to output the decompressed and decoded audio data at the head of the first buffer through an audio output device on the internet appliance; i.e. play the audio. (The audio output device can be any annunciating system or subsystem, such as an audio output circuit in a computer, an amplifier or stereo receiver, or audio speakers, whether supplied as part of the internet appliance, as part of a personal computer system, or as part of a home stereo system.) As the internet appliance continuously plays the audio data from the head of the first buffer, audio packets are still being added to the tail of the first buffer. Once the audio data at the head of the first buffered is played, it is lost or discarded from the first buffer to make room for new audio packets being received and added to the tail of the buffer. The streaming process provides an uninterrupted stream of audio to the audio device. However, the negotiation and buffering may take some several seconds (over ten seconds in some cases), creating a long gap of time between selection of a radio station and eventual play of the station's audio content on the audio device.

Figure 2A:
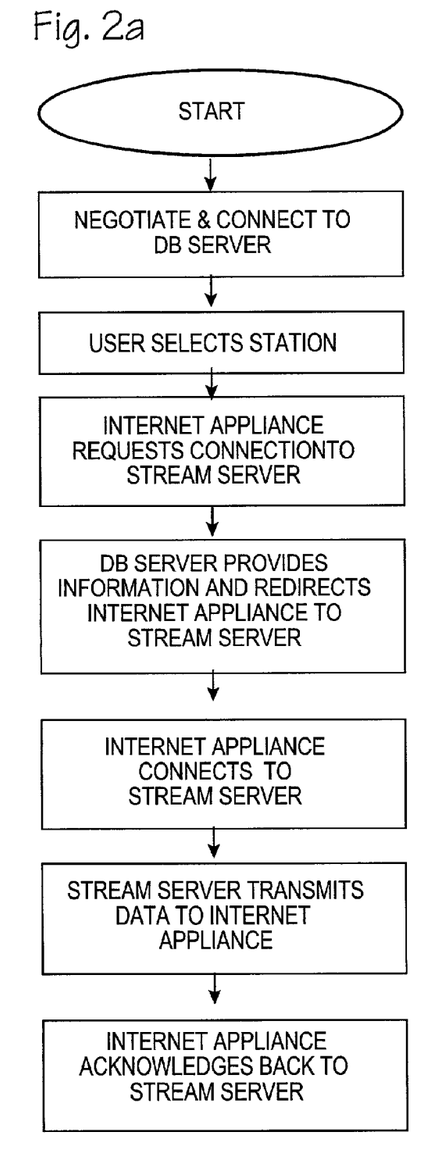
FIG. 2a is a flowchart of the method for selecting and receiving streaming audio from the first station.
Figure 2B:
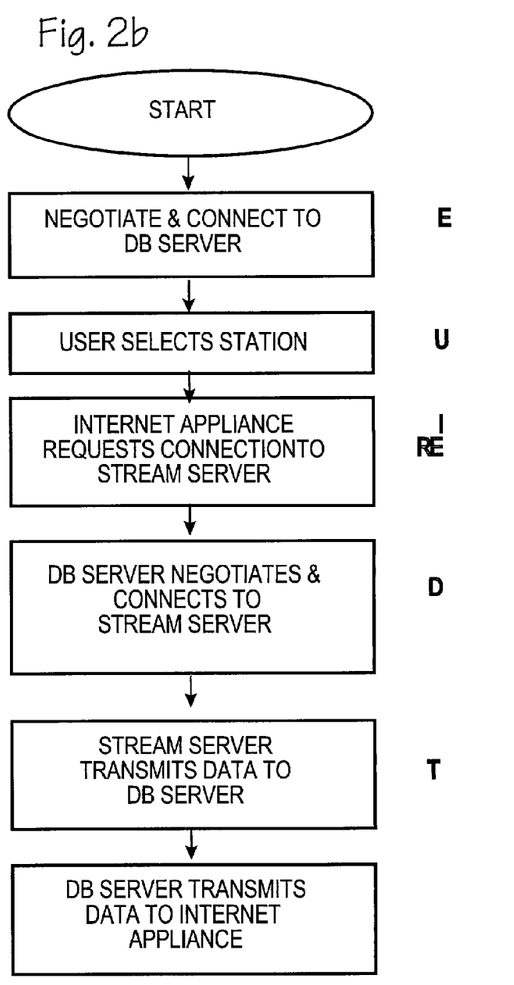
FIG. 2b is a flowchart of an alternative method for selecting and receiving audio from the first station.

FIGS. 2a and 2b are flowcharts of the method of selecting and receiving streaming audio from the first radio station. As illustrated in FIG. 2a, when the user turns on the internet appliance 2, the internet appliance negotiates connection with the internet radio database server 3. The user selects the first radio station server IRQQ 4, and the internet appliance requests connection with server IRQQ. The database server receives the request for server IRQQ from the internet appliance and matches the request with information about server IRQQ stored in the database server. The database server then redirects the internet appliance to the URL for the audio stream of server IRQQ. The internet appliance connects to server IRQQ. If the system does not include the database server, the internet appliance interfaces directly with server IRQQ. Once there is connection, server IRQQ transmits a stream of audio data to the internet appliance. The internet appliance acknowledges back to server IRQQ reception of the stream. The internet appliance and server IRQQ maintain the connection during the streaming of the data. Alternatively, as shown in FIG. 2b, the database server negotiates connection with server IRQQ and transfers the audio stream from server IRQQ to the internet appliance, passing the audio stream through the database server.

Figure 3:
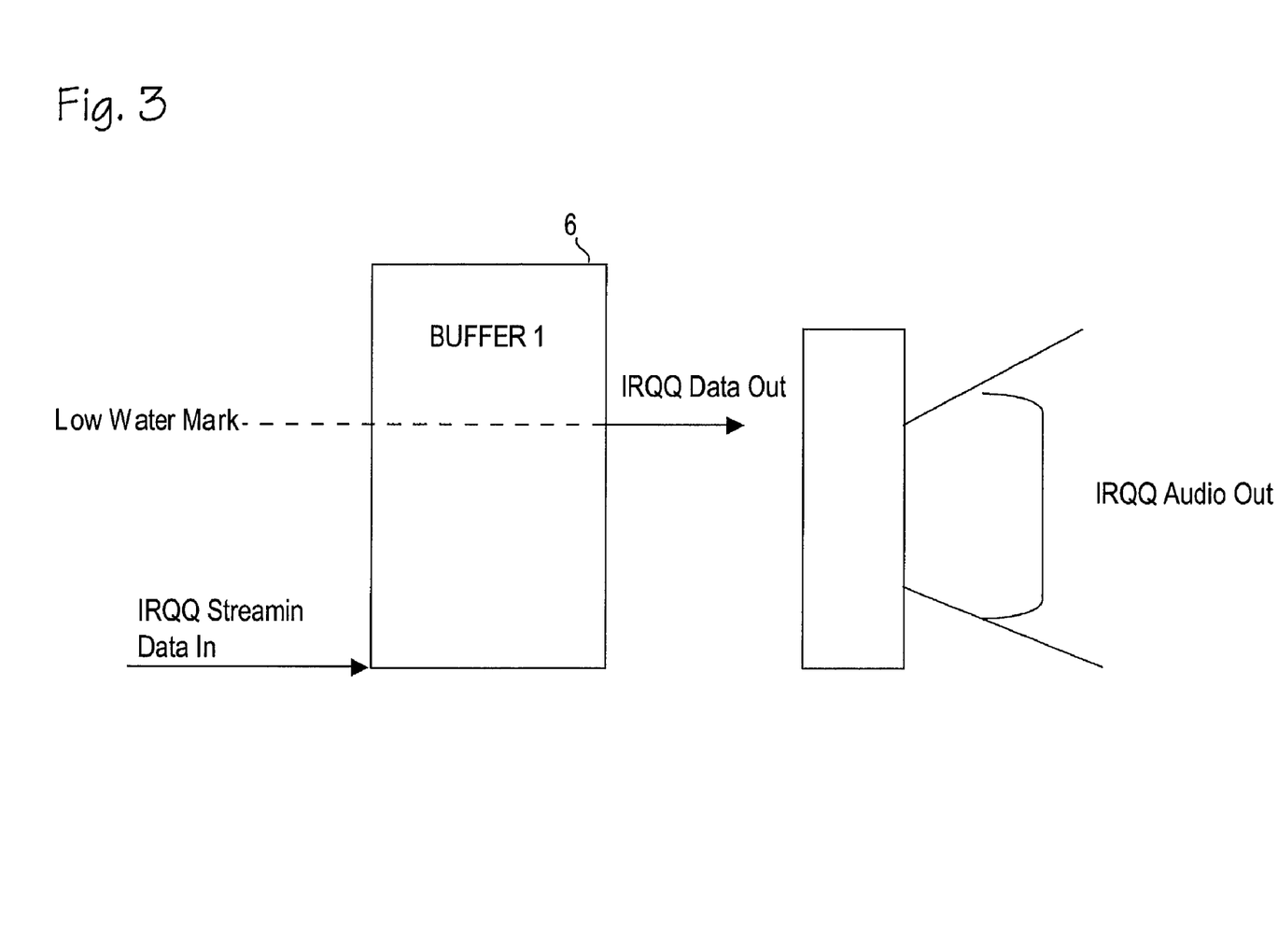
FIG. 3 is a simplified block diagram of storing and outputting media data from the first station.

In the system shown in FIG. 1 and illustrated schematically in FIG. 3, the user is already tuned to radio station server IRQQ 4, and is receiving streaming audio in an uninterrupted steady state. Packets of audio data arrive from server IRQQ and are added to the tail of the first buffer 6 while audio is played from the head of the first buffer. The amount of audio data buffered in the first buffer decreases if there is network congestion or if packets arrive late. The user hears audio from server IRQQ, slightly delayed in time due to both network transport delay but more significantly, due to the first buffer. Once the internet appliance begins playing out of the buffer, the user only perceives an interruption in play when the interruption in transmission from the content servers to the internet appliance lasts longer than the buffered period.

Figure 4:
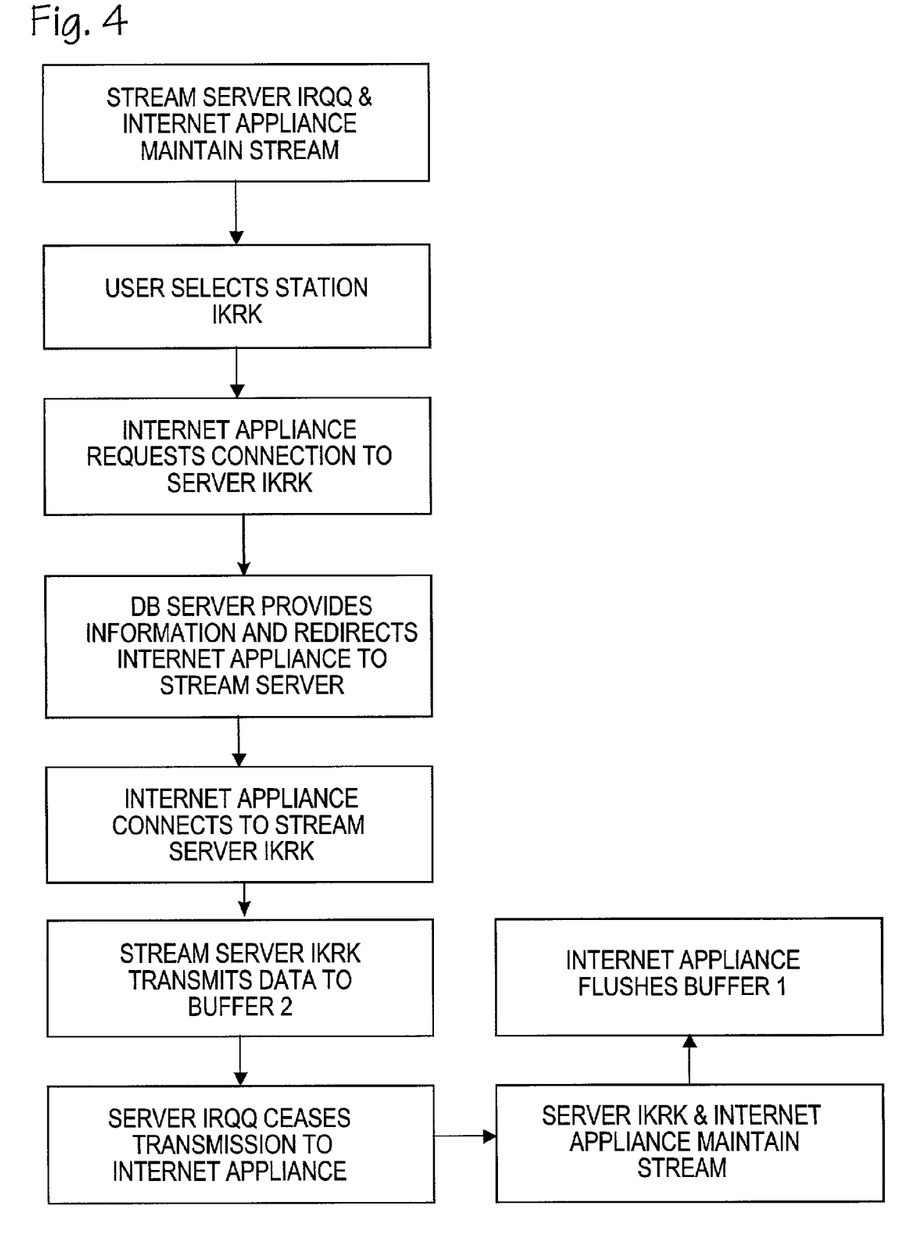
FIG. 4 is a flowchart of the method of switching between the first and second station.

FIG. 4 illustrates operation of the system after the user switches from server IRQQ 4 to server IKRK 5. The internet appliance 2 is still playing from server IRQQ. The user then turns the tuning knob (or operates a station selector input device of any sort) to select server IKRK and the internet appliance sends a request for server IKRK to the internet radio database server 3. The database server receives the request for server IKRK from the internet appliance and matches the request with information about server IKRK stored in the database server. The database server then redirects the internet appliance to the URL for the audio stream of server IKRK. Alternatively, the database server negotiates connection with server IKRK and transfers the audio stream from server IKRK to the internet appliance. Again, if the system does not include the database server, the internet appliance interfaces directly with server IKRK. Simultaneously or nearly so, the internet appliance stops receiving and buffering audio data from server IRQQ. However, there remains audio data from station IRQQ still buffered in the first buffer 6. This buffered data is played out until exhausted or until the data from the new stream reaches the low water mark, in contrast to dumping the buffer to be refilled with the new stream.

Figure 5:
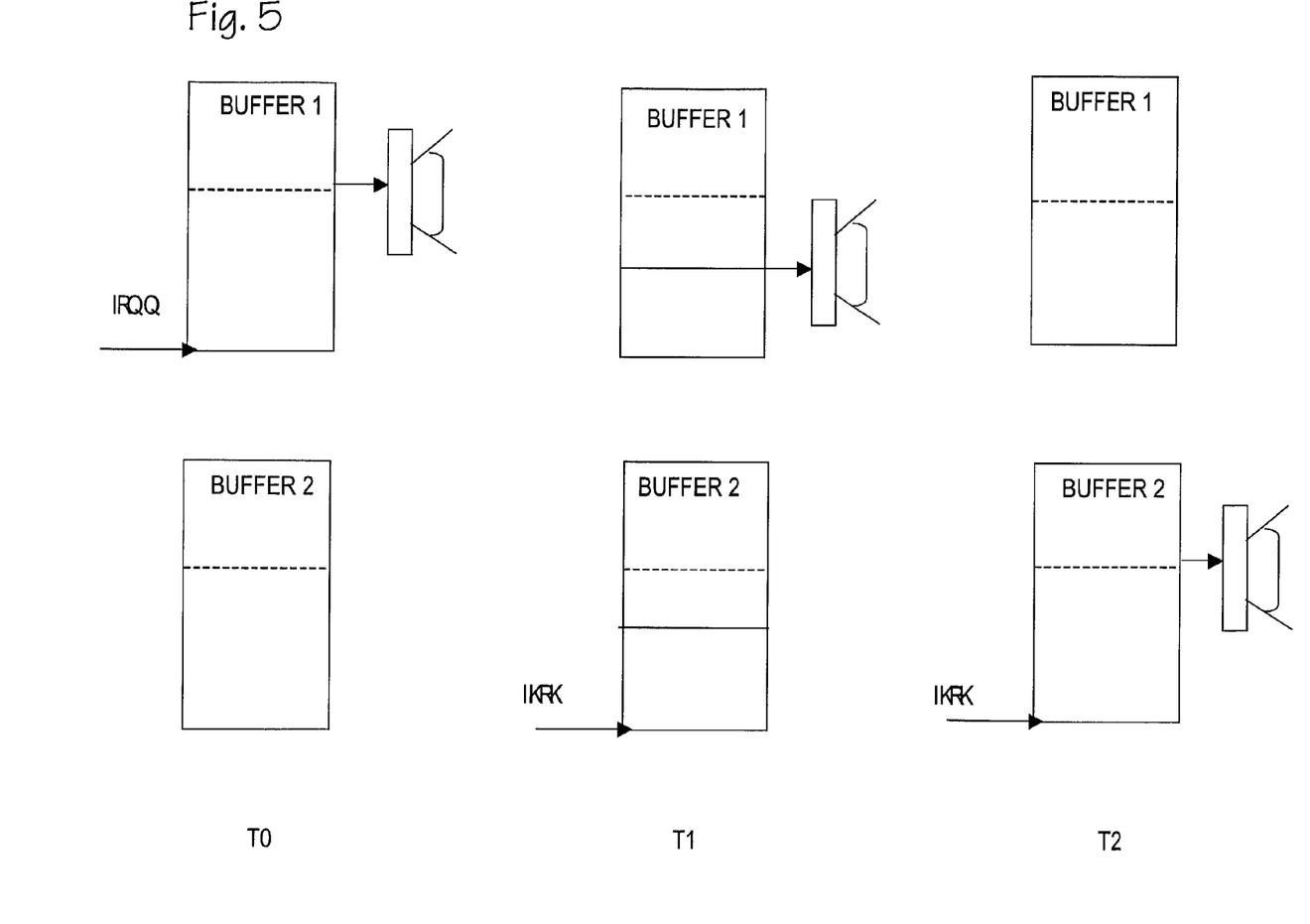
FIG. 5 is a simplified block diagram of storing media data from second station and outputting media data from first and second station.

FIG. 5 illustrates the system of FIG. 1 when the internet appliance switches stations. At T0, the system plays as described in reference to FIG. 3. Only one stream of data is received and played out. At T0, the user switches station to, in this example, IKRK 5. At T1 when the database server 3 and the internet appliance 2 successfully negotiate with server IKRK, server IRKR begins to stream compressed and encoded audio data packets to a second buffer 7 on the internet appliance. The second buffer is another area of memory on the internet appliance having generally the same low-water mark as the first buffer 6. The internet appliance will not play the audio data buffered in the second buffer until the low-water mark is reached. It may take several seconds for the database server and the internet appliance to negotiate connection with server IKRK and for the internet appliance to buffer to the low-water mark.

While the internet appliance 2 and the database server 3 are negotiating connection and buffering, the internet appliance is still playing the audio data already buffered and remaining in the first buffer 6. The internet appliance does not discard/flush the remaining audio data buffered in the first buffer. At T2 when the second buffer 7 reaches the low-water mark, the internet appliance stops playing audio data from the first buffer and begins decompressing and decoding audio data from the second buffer to the audio device. If there is audio data remaining in the first buffer, that data is flushed from the first buffer. The internet appliance is playing from the head of the second buffer while buffering audio data from server IKRK 5 to the tail of the second buffer, always trying to maintain the low-water mark of buffered audio data. The internet appliance is now playing a continuous stream of audio from station IKRK.

The point at which streaming from the first media server is stopped will typically be the point where the internet appliance begins negotiation with the second media server, and the first buffer will play out during negotiation and buffering of the second media stream from the second media server. If the first buffer contains sufficient information, and the second buffer is filled quickly enough, the output of the first buffer may continue until the second buffer is filled to the second low-water mark, thus resulting in continuous audio output. If bandwidth permits, the step of ceasing transmission of first media data may be simultaneous with the step of outputting second media data when the second buffer is filled to the second low-water mark. That is, streaming of the first stream may continue until the second stream is completely buffered.

The system minimizes the user's perception that an actual lag time exists during switching of internet radio stations. When the user switches audio sources by turning the knob on the internet appliance 2, the user hears continuous uninterrupted audio from server IRQQ 4 to server IKRK 5. The user hears continuous audio streaming from server IRQQ. As the user switches to server IKRK, the user still hears audio from server IRQQ in the form of the remaining buffered audio in the first buffer 6. Once IKRK's stream is buffered to the low-water mark, the user stops hearing audio from server IRQQ and begins to hear continuous audio streaming from server IKRK. The time from when the internet appliance stops buffering to the first buffer and switches to playing from the second buffer 7 may take on the order of several seconds. Because the switch is a relatively short period of time and because the user continuously hears audio, the user perceives an instantaneous switch from server IRQQ to server IKRK. The user does not perceive dead air time because the system is filling in this dead air time with the remaining audio already buffered in the first buffer.

Alternatively, instead of outputting audio from the second station instantaneously after the second buffer is filled to the low water mark, the system can insert a momentary silence, tone or audio clip between audio from one station to the next. The audio clip can be audio announcing the call letter of the next station or can be static. This will provide a discernable pause between the audio from one station to the next.

If the time for negotiation and play of audio from server IKRK 5 is longer than the remaining buffered audio of server IRQQ 4, the user will not hear broadcast content. There can be silence or the internet appliance can either play some other sound such as static or a stored audio clip. However, the system still minimizes the dead air time in that the system reduces the amount of dead air time the user experiences.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A computing device for receiving streaming media data from a plurality of media servers via a public network, wherein the computing device comprises:
   a processor;
   a first buffer; and
   a second buffer;
   wherein the computing device, in response to receiving a user input selecting a first media stream, is configured to establish a connection with a first media server via a public network and receive first media data of the first media stream from the first media server;

wherein the computing device is configured to store the first media data in the first buffer;

wherein the computing device is configured to output the first media data from the first buffer when the first buffer is filled to a predetermined first level;

wherein the computing device is configured to, in response to receiving a next user input selecting a second media stream:

establish a connection with a second media server and receive second media data of the second media stream from the second media server;

store the second media data in the second buffer;

direct the first media server to cease transmission of the first media data to the computing device and cease storing further first media data in the first buffer;

continue outputting the user selected first media data from the first buffer, and ceasing output of any remaining user selected first media data in the first buffer in response to the second buffer being filled with second media data to a predetermined second level; and output the second media data from the second buffer when the second buffer is filled to the predetermined second level.

2. The computing device of claim 1, wherein the computing device is further configured to discard any remaining first media data from the first buffer in response to the second buffer being filled to the predetermined second level.

3. The computing device of claim 1, wherein the computing device is further configured to continuously output streaming media data received from one of the media servers and stored in one of the buffers.

4. The computing device of claim 1, wherein the computing device is further configured to continuously output the stored media data from one of the buffers while additional media data is being stored in that buffer.

5. The computing device of claim 1, wherein said media data stored in the buffers is audio data, and wherein the computing device is configured to output the stored audio data and from one of the buffers via an audio output device.

6. The computing device of claim 1, wherein the computing device is configured as an Internet appliance configured to connect to Internet-based media servers via the Internet.

7. The computing device of claim 1, wherein the computing device is further configured to play streaming audio received from Internet-based audio content servers.

8. The computing device of claim 7, wherein said Internet-based audio content servers are radio station servers.

9. The computing device of claim 1, wherein the computing device is further configured to receive and play streaming audio in MP3 format.

10. A method for operating a computing device to receive streaming media data from a plurality of media servers via a public network, the method comprising:

in response to receiving a user input selecting a first media stream, the computing device establishing a connection with a first media server via a public network;

the computing device receiving first media data of the first media stream from the first media server;

the computing device storing the first media data in a first buffer of the computing device;

the computing device outputting the first media data from the first buffer when the first buffer is filled to a predetermined first level;

in response to receiving a next user input selecting a second media stream, the computing device establishing a connection with a second media server;

the computing device receiving second media data of the second media stream from the second media server;

the computing device storing the second media data in a second buffer of the computing device;

the computing device directing the first media server to cease transmission of the first media data to the computing device in response to the computing device receiving the next user input for connecting to the second media server;

the computing device ceasing storing further first media data in the first buffer of the computing device in response to the computing device receiving the next user input;

to reduce dead air time, the computing device continuing to output the user selected first media data from the first buffer after the computing device receives the next user input, ceasing outputting of any remaining first media data in the first buffer when the second buffer is filled to the predetermined second level; and the computing device outputting the second media data from the second buffer when the second buffer is filled to the predetermined second level.

11. The method of claim 10, further comprising the computing device continuing to output the first media data from the first buffer until the second buffer is filled to the predetermined second level.

12. The method of claim 10, further comprising, in response to the second buffer being filled to the predetermined second level, the computing device discarding any remaining first media data from the first buffer in addition to outputting the second media data from the second buffer.

13. The method of claim 10, wherein said directing the first media server to cease transmission of the first media data is simultaneous with said outputting the second media data from the second buffer when the second buffer is filled to the predetermined second level.

14. The method of claim 10, further comprising the computing device continuously outputting streaming media data received from one of the media servers and stored in one of the buffers.

15. The method of claim 10, further comprising continuously outputting the stored media data from one of the buffers while additional media data is being stored at the one buffer.

16. The method of claim 10, wherein said media data stored in the buffers is audio data, and wherein said method further comprising the computing device outputting the stored audio data from one of the buffers via an audio output device.

17. The method of claim 10, wherein said computing device is configured as in Internet appliance, and said media servers are configured as Internet-based radio station servers.

18. The method of claim 10, further comprising the computing device receiving and playing streaming audio in MP3 format.

19. An Internet appliance configured to receive streaming audio data from a plurality of audio content servers via a public network, the Internet appliance comprising:

a first buffer;

a second buffer;

a processor; and a memory storing program instructions executable by the processor to:

in response to receiving a user input selecting a first media stream, establish a connection with a first audio content server via a public network to receive first audio data of the first media stream from the first audio content server;

store the first audio data in the first buffer of the Internet appliance;

output the first audio data from the first buffer when the first buffer is filled to a predetermined first level;

in response to a next user input selecting a second media stream, establish a connection with a second audio content server to receive second audio data of the second media stream from the second audio content server;

store the second audio data in the second buffer of the Internet appliance;

direct the first audio content server to cease transmission of the first audio data to the Internet appliance in response to the Internet appliance receiving the next user input for connecting to the second audio content server;

cease storing further first audio data in the first buffer in response to the Internet appliance receiving the next user input;

continue outputting the user selected first audio data from the first buffer after the Internet appliance receives the next user input and until the second buffer is filled to a predetermined second level; and output the second audio data from the second buffer when the second buffer is filled to the predetermined second level.

20. The Internet appliance of claim 19, wherein the Internet appliance is further configured as a stand-alone device operable to connect with a plurality of audio content servers via the public network.

21. The Internet appliance of claim 19, wherein the Internet appliance is further configured to connect with a plurality of audio content servers of the public network via a personal computer.

22. The Internet appliance of claim 19, wherein the Internet appliance is further configured as a personal computer.

23. The Internet appliance of claim 19, wherein the Internet appliance is further configured as a Web TV system.

24. A computer readable memory medium storing program instructions executable by a computing device to perform a method, the method comprising:

in response to receiving a user input selecting a first media stream at the computing device, establishing a connection with a first audio content server via a public network to receive first audio data of the first media stream from the first audio content server;

storing the first audio data in a first buffer of the computing device;

outputting the first audio data from the first buffer when the first buffer is filled to a predetermined first level;

in response to a next user input selecting a second media stream at the computing device:

establishing a connection with a second audio content server to receive second audio data of the second media stream from the second audio content server;

storing the second audio data in a second buffer of the computing device;

directing the first audio content server to cease transmission of the first audio data to the computing device;

continue outputting the user selected first audio data from the first buffer, ceasing output of any remaining first audio data in the first buffer when the second buffer is filled to a predetermined second level; and outputting the second audio data from the second buffer when the second buffer is filled to the predetermined second level.

25. An Internet appliance for playing streaming audio data from a plurality of audio content servers via the Internet, wherein the Internet appliance comprises:

a processor;

a first buffer; and a second buffer;

wherein the Internet appliance is configured to, in response to receiving a user input selecting a first media stream, establish a connection with a first audio content server via the Internet and receive first audio data of the first media stream from the first audio content server;

wherein the Internet appliance is configured to store the first audio data in the first buffer;

wherein the Internet appliance is configured to output the first audio data from the first buffer when the first buffer is filled to a predetermined first level;

wherein the Internet appliance is configured to, in response to a next user input selecting a second media stream, establish a connection with a second audio content server and receive second audio data of the second media stream from the second audio content server;

wherein the Internet appliance is configured to store the second audio data in the second buffer;

wherein the Internet appliance is configured to direct the first audio content server to cease transmission of the first audio data to the Internet appliance in response to the Internet appliance receiving the next user input for connecting to the second audio content server, and wherein the Internet appliance is configured to cease storing further first audio data in the first buffer in response to the Internet appliance receiving the next user input;

wherein, to reduce dead air time during a switch from outputting the first audio data from the first buffer to outputting the second audio data from the second buffer, the Internet appliance is configured to continue outputting the user selected first audio data from the first buffer after the Internet appliance receives the next user input, ceasing outputting any remaining first audio data from the first buffer when the second buffer is filled to a predetermined second level; and wherein the Internet appliance is configured to output the second audio data from the second buffer when the second buffer is filled to the predetermined second level.

26. The Internet appliance of claim 25, wherein the Internet appliance is configured to output an audio clip when the second buffer is filled to the predetermined second level, and before outputting the second audio data from the second buffer.

27. The Internet appliance of claim 26, wherein the audio clip is an audible announcement providing identification information associated with the second audio content server.

* * * * *

UNITED STATES PATENT AND TRADEMARK OFFICE
CERTIFICATE OF CORRECTION

PATENT NO. : 7,631,088 B2  Page 1 of 1
APPLICATION NO. : 09/798797
DATED : December 8, 2009
INVENTOR(S) : Logan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2268 days.

Signed and Sealed this

Second Day of November, 2010

David J. Kappos
*Director of the United States Patent and Trademark Office*